US008646076B1

(12) United States Patent
Lim et al.

(10) Patent No.: US 8,646,076 B1
(45) Date of Patent: Feb. 4, 2014

(54) METHOD AND APPARATUS FOR DETECTING MALICIOUS SHELL CODES USING DEBUGGING EVENTS

(71) Applicant: Ahnlab, Inc., Gyeonggi-do (KR)

(72) Inventors: Cha Sung Lim, Gyeonggi-do (KR); Ju Seok Lee, Gangwon-do (KR)

(73) Assignee: Ahnlab, Inc., Gyeonggi-Do (KR)

( * ) Notice: Subject to any disclaimer, the term of this patent is extended or adjusted under 35 U.S.C. 154(b) by 0 days.

(21) Appl. No.: 13/875,421

(22) Filed: May 2, 2013

(30) Foreign Application Priority Data

Sep. 11, 2012 (KR) .......................... 10-2012-0100255

(51) Int. Cl.
*G06F 12/14* (2006.01)
(52) U.S. Cl.
USPC ................................. 726/22; 24/26
(58) Field of Classification Search
USPC ................................. 726/24, 22, 26
See application file for complete search history.

(56) References Cited

U.S. PATENT DOCUMENTS

| 7,437,759 | B1 * | 10/2008 | Szor .............................. 726/22 |
| 8,037,529 | B1 * | 10/2011 | Chiueh et al. ................. 726/22 |
| 8,166,545 | B2 | 4/2012 | Kim et al. |
| 2009/0094585 | A1 * | 4/2009 | Choi et al. ..................... 717/131 |
| 2012/0042145 | A1 * | 2/2012 | Sehr et al. ..................... 711/163 |

FOREIGN PATENT DOCUMENTS

| KR | 100850361 | 7/2008 |
| KR | 1020100005518 | 1/2010 |
| KR | 100945247 | 2/2010 |
| KR | 1020110046850 | 5/2011 |

OTHER PUBLICATIONS

Brian Mariani, "Structured Exception Handler Exploitation", Jun. 15, 2011, High Tech Bridge Information Security Systems.*
"Case of Malicious Code Distribution," Journal of KISA (Korea Internet & Security Agency), vol. 6, 2011.

* cited by examiner

*Primary Examiner* — Jung Kim
*Assistant Examiner* — Thomas Ho
(74) *Attorney, Agent, or Firm* — Bacon & Thomas, PLLC

(57) ABSTRACT

An apparatus for detecting malicious shell codes using a debugging event includes an alert setting unit configured to set a mother program to run a non-executable file to trigger the debugging event when a mother process created by the mother program tries to execute a code with no execution attribute; and an information storage unit configured to store information on an address range in which modules to be used by the mother process are loaded in a memory. Further, the apparatus includes a malicious code determination unit configured to determine whether the non-executable file is malicious using the information on the address range when there occurs the debugging event.

16 Claims, 5 Drawing Sheets

METHOD AND APPARATUS FOR DETECTING MALICIOUS SHELL CODES USING DEBUGGING EVENTS

FIELD OF THE INVENTION

The present invention relates to an apparatus and method for detecting malicious shell codes using debugging events. And, more particularly, the present invention relates to an apparatus and method for determining whether a non-executable file contains a malicious shell codes using a debugging event, and a computer-readable storage medium including computer executable instructions to perform the method.

BACKGROUND OF THE INVENTION

With the spread of a wide range of the Internet and wireless communication devices, routes of infection of malicious software or malicious codes are becoming more diverse and the extent of damage caused thereby increases every year. The term "malicious code" used herein refers to as the software that has been intentionally produced to perform vicious behavior contrary to the intention and interests of a user, such as destroying the computer system and leaking information. There are various kinds of malicious codes such as virus, worms, Trojan, backdoor, logic bomb, trap doors, etc. used as a hacking tool, vicious spyware, vicious adware and the like. The malicious codes, through self-replication or automatic breeding, cause problems such as the leakage of personal information such as a password and an identifier (ID) of a user, system control, change/deletion of files, destruction of the system, denial of service of application/system, leakage of core data and installation of the other hacking programs, which results in very diverse and serious damage.

To solve these problems, a malware treating system (or vaccine program) has been developed to detect and treat the malicious codes. Most malware treating systems, known so far, use a file-based diagnostic method. The file-based diagnostic method originates from the fact that the malicious code takes a type of files executable in a particular system so that it can be run on the particular system. For example, most malicious codes take a type of PE (Portable Executable) files to run on the Windows system such as the Win32 operating system. By way of example, the PE file has a file extension such as exe, cpl, ocx, dll, vxd, sys, scr, dry or the like.

To detect the malicious codes having the type of execution files or executable files, the malicious code treating system also needs to have a specific format of the signature which can classify the malicious codes by recognizing the file type. Such method is one of the diagnostic methods similar to the signature-based inspection methods or the string inspection methods used in most malicious code treating systems. A signature-based inspection method checks such target objects as specific or unique parts of the files classified as the malicious code, and therefore has advantages of the possibility of an accurate diagnosis which minimizes false positive and false negative and a high speed scanning obtained by scanning only specific parts of the files during the file inspection. However, the signature-based inspection method has disadvantages that it cannot respond with respect to any modification with a slight change in files since it may occur the false negative making an incorrect diagnosis even if only hundreds of bytes change in the file itself of the malicious code. Further, the signature-based inspection method has a countermeasure against only the known malicious codes, but has shortcoming that it cannot respond to hitherto unknown malicious codes with different types.

On the other hand, an APT (Advanced Persistent Threat), which is one of the issues in recent, persistently utilizes various types of malicious codes with high attacking techniques in order to steal information targeted by an attacker. Particularly, the APT is nearly detected in an early invasion phase, and it typically employs non-executable files. For example, the APT generally uses non-PE files of the Window System such as the Win32 operating system. It is because that the programs for running the non-PE files, such as word-processors or imaging programs, have essentially some degree of security vulnerability and that variant malicious codes can be easily made with the change in the non-PE files if the malicious codes are included in the non-PE files.

Owing to the above properties, there are many cases where the APT employs a malicious non-executable file exploit to achieve the Zero-day attack. For example, if a recipient inadvertently opens the malicious non-executable file attached to the email on his/her computer system, the computer system is then infected with the malicious file, such that the malicious file can attack other computer systems and invade the computer systems to steal key data. In addition, since the non-executable file has a variety of formats, needed are the substantial amount of time and effort that an expert examines whether the non-executable file is malicious and analyzes the vicious activities done by the non-executable file. Moreover, from the standpoint of almost all the conventional techniques, it is not easy to find a countermeasure against some variant malware deformed and newly created even for the analysis duration.

For example, for the conventional signature-based inspection method, a large amount of signature databases is necessary to identify different types of attacks, which is far from realistic. Therefore, the conventional signature-based inspection method could not effectively protect the computer systems against the Zero-day exploit employing the malicious non-executable files.

Further, in the conventional action-based inspection method, it is required to obtain information such as design methods necessary for detecting the behaviors of different attackers, which leads to a false positive and false negative.

Accordingly, there is a strong need to develop a malware treating system capable of quickly and correctly inspecting whether or not non-executable files include the malicious codes.

SUMMARY OF THE INVENTION

In view of the above, the present invention provides an apparatus and method for detecting malicious shell codes using a debugging event, which is capable acquiring information on the address range on which normal modules are loaded in a memory with the execution of the program of the non-executable file and determining whether the non-executable file is malicious by using the acquired address range at the time of the occurrence of debugging event.

It is noted that the purpose of the present invention does not limited to the above described one, and the other purposes of the present invention can be obviously comprehended by those skilled in the art from the description as follows.

In accordance with a first aspect of the present invention, there is provided an apparatus for detecting malicious shell codes using a debugging event. The apparatus includes an alert setting unit configured to set a mother program for executing a non-executable file to trigger the debugging event when a mother process created by the mother program tries to execute a code with no execution attribute; an information storage unit configured to store information on an address range in which modules to be used by the mother process are loaded in a memory; a malicious code determination unit configured to determine whether the non-executable file is malicious using the information on the address range when the debugging event occurs; and a cause analyzing unit configured to compare the module having the instruction related to the execution address out of the address range with information on vulnerabilities to analyze the reason for the vulnerability when it is determined that the non-executable file is malicious. Further, the apparatus includes malicious code extraction unit configured to extract the code in memory regions corresponding to the execution address out of the address range, wherein the alert setting unit injects a data execution alerting thread into a target process to be detected when the debugging event occurs by the mother process, wherein the malicious code determination unit determines that the non-executable file is malicious when the execution address of the instruction executed by the mother process is out of the address range, determines whether the non-executable file is malicious depending on information about whether a SEH (Structured Exception Handling) is infected when the execution address of the instruction is within the address range, and determines that the structured exception handling is infected and the non-executable file is malicious when a current address of a chain value of the structured exception handling is the same as that the address of a next structured exception handling.

Here, the information storage unit may store a starting address and an end address on which the modules to be used by the mother process are loaded in the memory.

The malicious code determination unit may determine that the non-executable file is malicious when the execution address of the instruction executed by the mother process is out of the address range.

Further, the malicious code determination unit may determine whether the non-executable file is malicious depending on information about whether a SEH (Structured Exception Handling) is infected when the execution address of the instruction is within the address range.

The malicious code determination unit may obtain the chain value of a debugger using an additional data segment in a central processing unit.

Further, the additional data segment may be an FS register (data register F) segment.

The malicious code determination unit may determine that the non-executable file is malicious when the current address of the chain value of is not the same as an address of the chain value of the next structured exception handling and the current address of the chain value does not exist whithin the address range in which the modules are loaded in the memory.

Further, the malicious code determination unit may determine that the non-executable file is malicious when the current address of the chain value exists whithin the address range in which the modules are loaded in the memory and a count of the chain value is greater than or equal to a predetermined value.

In accordance with a second aspect of the present invention, there is provided a method for detecting malicious shell codes using a debugging event. The method includes: setting a mother program for executing a non-executable file to trigger the debugging event when a mother process created by the mother program tries to execute a code with no execution attribute; acquiring information on address range on which modules to be used by the mother process are loaded in a memory; and determining whether the non-executable file is malicious using the address range when there occurs the debugging event.

Further, the method includes, when it is determined that the non-executable file is malicious, analyzing the reason for the vulnerability by comparing the module having the instruction related to the execution address out of the address range with the information on vulnerabilities; and when it is determined that the non-executable file is malicious, extracting the code in memory region which corresponds to the execution address beyond the address range, wherein said setting a mother program comprises: identifying whether there occurs the debugging event; and injecting a data execution alerting thread in a target process to be detected when the debugging event occurs, and wherein said determining whether the non-executable file comprises: determining that the non-executable file is malicious when an execution address of the instruction executed by the mother process is out of the address range.

Furthermore, the method includes determining whether the non-executable file is malicious depending on information about whether a SEH (Structured Exception Handling) is infected when the execution address of the instruction executed by the mother process is within the address range; and after obtaining a chain value of the SEH, determining that the structured exception handling is infected and the non-executable file is malicious when a current address of a chain value of the structured exception handling is identical to an address of a next structured exception handling.

Further, said acquiring information on the address range may comprise storing a starting address and an end address on which the modules to be used by the mother process are loaded in the memory.

Further, said determining whether the non-executable file is malicious may comprise determining that the non-executable file is malicious when an execution address of the instruction executed by the mother process is out of the address range.

Further, said determining whether the non-executable file is malicious may comprise determining whether the non-executable file is malicious depending on information about whether a SEH (Structured Exception Handling) is infected when the execution address of the instruction executed by the mother process is within the address range.

Further, said obtaining the chain value may comprise obtaining the chain value of a debugger using an additional data segment in a central processing unit.

Further, the additional data segment may be an FS register (data register F) segment.

Further, said determining whether the non-executable file is malicious may comprise determining that the non-executable file is malicious when the current address of the chain value of is not the same as an address of the chain value of the next structured exception handling and the current address of the chain value does not exist whithin the address range in which the modules are loaded in the memory.

Further, said determining whether the non-executable file is malicious may comprise determining that the non-executable file is malicious when the current address of the chain value exists whithin the address range in which the modules are loaded in the memory and a count of the chain value is greater than or equal to a predetermined value.

As described above, the apparatus for detecting malicious shell codes acquires the address range information having starting address and end address normally loaded upon a program running and determines whether a non-executable file is malicious using the acquired address range information at the time of a debug event executed by a mother process. Therefore, the malicious non-executable file can be detected before running its malicious codes.

Further, in accordance with an exemplary embodiment of the present invention, the apparatus for detecting malicious shell code determines whether the non-executable file is malicious at the debug event triggered when the mother process begins to run codes without execution attribute. Therefore, the apparatus has a higher detection accuracy in comparison with the conventional inspection method with the black list of the candidate malicious addresses because it can not only detect the malicious non-executable files, but also determine the non-executable file as the malicious non-executable file even that the non-executable file does not be contained in a black list of the malicious candidate addresses. In other words, the apparatus of the present invention may exhibit the detection ability identical to the conventional method even when it is compared to the conventional method on whether they can detect the malicious non-executable file with respect to all the suspicious addresses.

The apparatus may be compared with the conventional method even in the capability of the detection on whether they can detect the malicious non-executable file with respect to all the suspicious addresses.

Accordingly, it may be possible to protect effectively the system against the ATP scenarios using the vulnerability of the malicious non-executable file.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
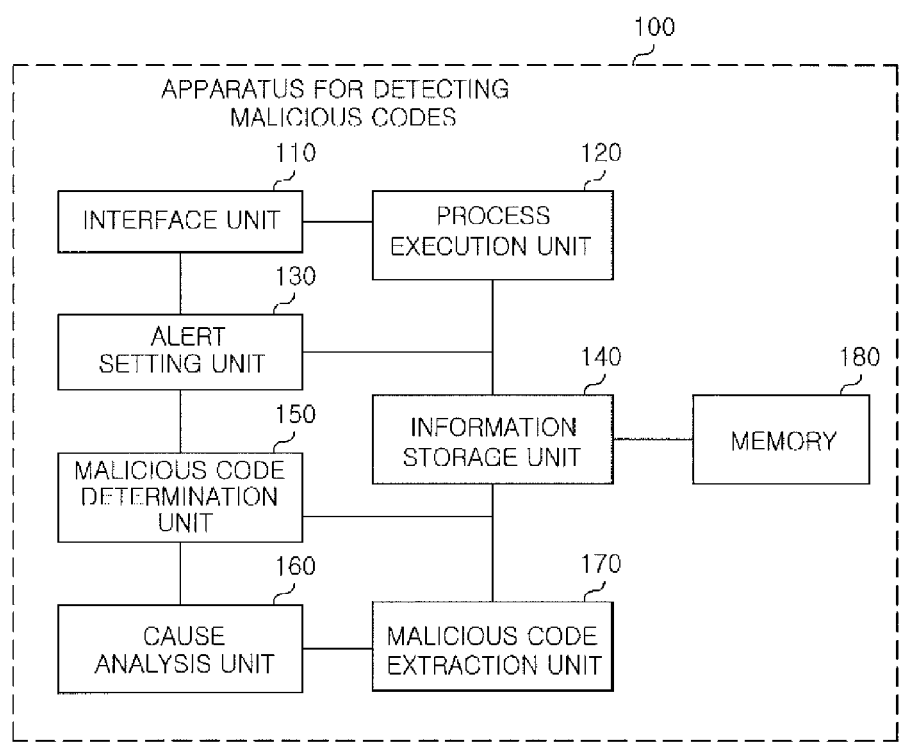
FIG. 1 is a block diagram of an apparatus for detecting a malicious shell code using a debug event in accordance with an exemplary embodiment of the present invention.

The advantages and features of embodiments and methods of accomplishing the present invention will be clearly understood from the following described description of the embodiments taken in conjunction with the accompanying drawings. However, the present invention is not limited to those embodiments and may be implemented in various forms. It should be noted that the embodiments are provided to make a full disclosure and also to allow those skilled in the art to know the full range of the present invention. Therefore, the present invention will be defined only by the scope of the appended claims.

In the following description, well-known functions or constitutions will not be described in detail if they would unnecessarily obscure the embodiments of the invention. Further, the terminologies to be described below are defined in consideration of functions in the invention and may vary depending on a user's or operator's intention or practice. Accordingly, the definition may be made on a basis of the content throughout the specification. The term "the non-executable file" used herein refers to as a file, having a concept opposite to the execution file or an executable file, which cannot be run by itself. For example, the non-executable file may include, but not limited to, a document file such as a Hanword file, MS-word file, an image file including as a JPEG file, a moving image file, a JavaScript file, an HTML file and the like.

A malicious non-executable file containing malicious codes may be used in an APT (Advanced Persistent Threat) attack and the like via a way of being attached to an email or of transferring the malicious non-executable file itself through a network. In these cases, the malicious code may be a shell code, which may be executed when a program having the type (or format) of the non-executable file is executed. The non-executable file, for example, may include, files having a filename extension such as hwp, doc, pdf, jpg, js, html and the like.

The malicious non-executable files may include a malicious shell code, and the malicious non-executable file including the malicious codes may move to a region of the malicious code region when an instruction is executed by any means. The movement of the malicious non-executable file may be predicted through the confirmation of the execution address of the instruction. For example, this may be achieved by identifying a value stored in an EIP (Extended Instruction Pointer) register, which is one of a plurality of registers in a central processing unit (CPU), and then checking an address of an instruction to be executed in next sequence via the EIP value. Therefore, whether the malicious file has the instruction moving to the region of the malicious shell code beyond the normal address range may be an important clue for determining as to whether the non-executable file is a malicious one.

Hereinafter, embodiments of the present invention will be described in detail with reference to the accompanying drawings which form a part hereof.

FIG. 1 is a block diagram of an apparatus for detecting malicious shell codes using a debugging event in accordance with an exemplary embodiment of the present invention.

As shown in FIG. 1, an apparatus 100 for detecting malicious shell codes of the exemplary embodiment is configured to analyze and report whether the non-executable file has a malicious code at the occurrence of a debugging event triggered when a mother program executes a non-executable file loaded thereon and a mother process executes codes with no execution attribute. To this end, the apparatus 100 of the exemplary embodiment includes an interface unit 110, a process execution unit 120, an alert setting unit 130, an information storage unit 140, a malicious code determination unit 150, a cause analysis unit 160, a malicious code extraction unit 170 and a memory 180.

The interface unit 110 serves to provide an interface for selecting a directory storing suspicious non-executable files to be inspected and any non-executable files.

The process execution unit 120 determines the type of the non-executable file selected through the interface 110 and executes the non-executable file under the control of the mother program depending on the determined type. The process execution unit 120 may provide an execution address of an instruction to execute the non-executable file through the use of information stored in any one of registers in a central processing unit (CPU). For example, a memory address of the instruction to be executed in next sequence may be stored in an EIP (Extended Instruction Pointer) register of the central processing unit.

The alert setting unit 130 sets the mother program for executing a non-executable file to trigger the debugging event when the mother processor created by the mother program tries to execute the code with no execution attribute. For example, the alert setting unit 130 may inject a data execution alerting thread into a target process to be detected, i.e., target process trying to execute the code with no execution attribute when the mother process triggers a debugging event such as an event to load a kernel module, e.g., Kernel32.dll module. The information storage unit 140, with the operation of the mother program, acquires and stores information on address range for a memory 180 having normal modules to be used by the mother process loaded therein. For example, the information on address range may be the address range having a starting address and end address of the modules loaded in the memory 180.

The malicious code determination unit 150 determines as to whether the non-executable file is malicious using the acquired address range information in the information storage unit 140 when there occurs the debugging event triggered when the mother process tries to execute the code with no execution attribute. For example, the malicious code determination unit 150 may determine whether the non-executable files is malicious on a basis of the determination on whether an execution address for the respective instruction in the modules to be executed by the mother program is out of the acquired address range. To be more specific, the malicious code determination unit 150 identifies a case where the execution address of the instruction executed by the mother process is beyond the acquired address range and regards the non-executable file as a malicious file. That is, the non-executable file may be classified into the malicious file in a case where the execution address stored in the EIP register of the central processing unit deviates from the normal address range.

Meanwhile, when it is determined that the execution address of the instruction is within the normal address range, the malicious code determination unit 150 determines whether the non-executable file is malicious by additionally determining whether to infect a structured exceptional handling. To do it, a chain value of the structured exceptional handling is obtained, and the chain value, i.e., a current address, is compared with a next chain value of the structured exceptional handling. As a comparison result, when the chain value is identical to the next chain value, the malicious code determination unit 150 determines that the non-executable file is infected with a malicious code and regarded it as the malicious file. The chain value of a debugger may be obtained through the use of an additional data segment, for example, FS register (data register F) segment, in the central processing unit.

However, as the comparison result, when the current address of the chain value is not identical to an address of the next chain value, the malicious code determination unit 150 determines whether the current address of the chain value falls within the address range of the modules normally loaded into the memory 180. If it is determined that the current address of the chain value is beyond the address range, the malicious code determination unit 150 may decide the non-executable file as a malicious file. However, if it is determined that the current address of the chain value falls within the address range, the malicious code determination unit 150 determines whether a count of the structured exceptional handling is greater than or equal to a predetermined value, and may decide the non-executable file as a malicious file if the count is greater than the predetermined value.

When the non-executable file is decided as a malicious file by the malicious code determination unit 150, the cause analysis unit 160 may then compare the module having the instruction with the execution address out of the normal address range with information on predetermined vulnerabilities to analyze the generation reason for the vulnerability. The analyzed generation reason for the vulnerability may be provided to a malware inspection and analysis server with the connection to a communication network, or a particular analyzer or user. In this regard, the information on the vulnerabilities may be information provided from CVE (Common Vulnerabilities and Exposures), Microsoft Security Bulletin (for example, MS11-002), NVD (National Vulnerability Database), US-CERT Bulletin, and the like, but not limited thereto.

Meanwhile, when the non-executable file is decided as a malicious file by the malicious code determination unit 150, the malicious code extraction unit 170 may extract the code in a memory region corresponding to the execution address out of the normal address range in a type of an execution file or an executable file. Herein, the type of execution file or executable file may have a file format that ends with the filename extension of exe, cpl, dll, ocx, vxd, sys, scr, dry, etc, but not limited thereto. Further, the malicious code extraction unit 170 may transfer the code extracted in the type of the executable file or the execution file to the malicious code inspecting and analyzing server, which is connected via the communication network, for the inspection request of the extracted codes.

Though the above exemplary embodiment has been shown and described that the cause analyzing unit 160 is arranged within the apparatus 100, it is only for the illustrative purpose and is not limited thereto. Alternatively, the cause analyzing unit 170 may be installed on a separate server for malicious code inspecting and analyzing with the connection to the communication network.

Figure 2:
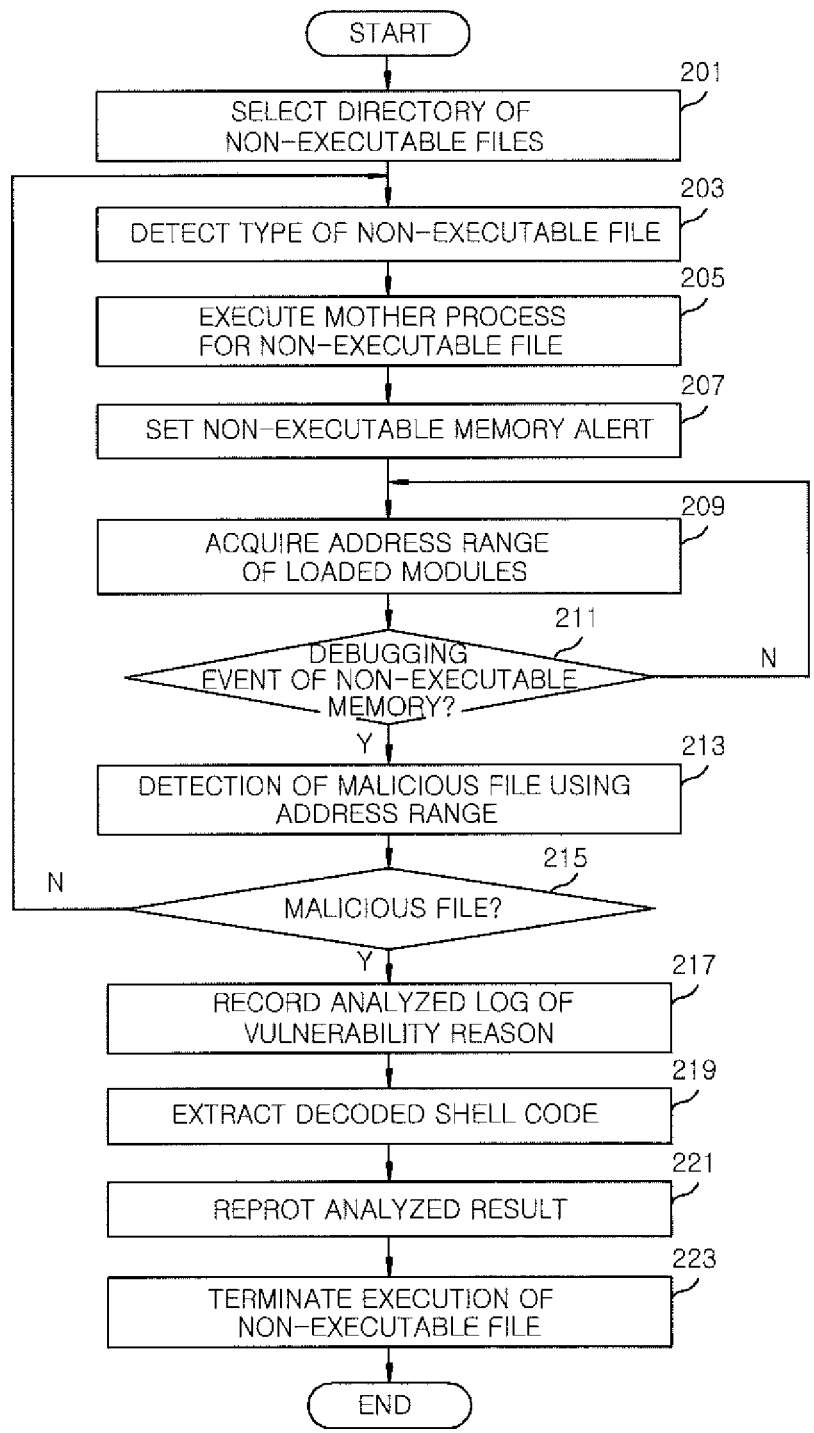
FIG. 2 illustrates a flow chart illustrating a method for detecting a malicious shell code using a debug event in accordance with an exemplary embodiment of the present invention.

FIG. 2 is a flow chart illustrating a method for detecting malicious shell codes in accordance with an exemplary embodiment of the present invention.

As illustrated, the method for detecting malicious shell codes in accordance with an exemplary embodiment of the present invention includes setting a mother program for executing a non-executable file to trigger the debugging event when a mother process created by the mother program tries to execute a code with no execution attribute in operations 201 to 207; acquiring information on address range on which modules to be used by the mother process are loaded in a memory 180 in operation 209; determining whether the non-executable file is malicious using the information on the address range when there occurs the debugging event occurs in operations 211 to 215; comparing the module having the instruction related to the execution address out of the address range with information on predetermined vulnerabilities to analyze the reason for the vulnerability when it is determined that the non-executable file is malicious in operation 217; extracting the code in a memory region corresponding to the execution address out of the address range in operation 219; and terminating the execution of the non-executable file while reporting the reason of the vulnerability and the extraction result of the malicious codes in operations 221 and 223.

Figure 3:
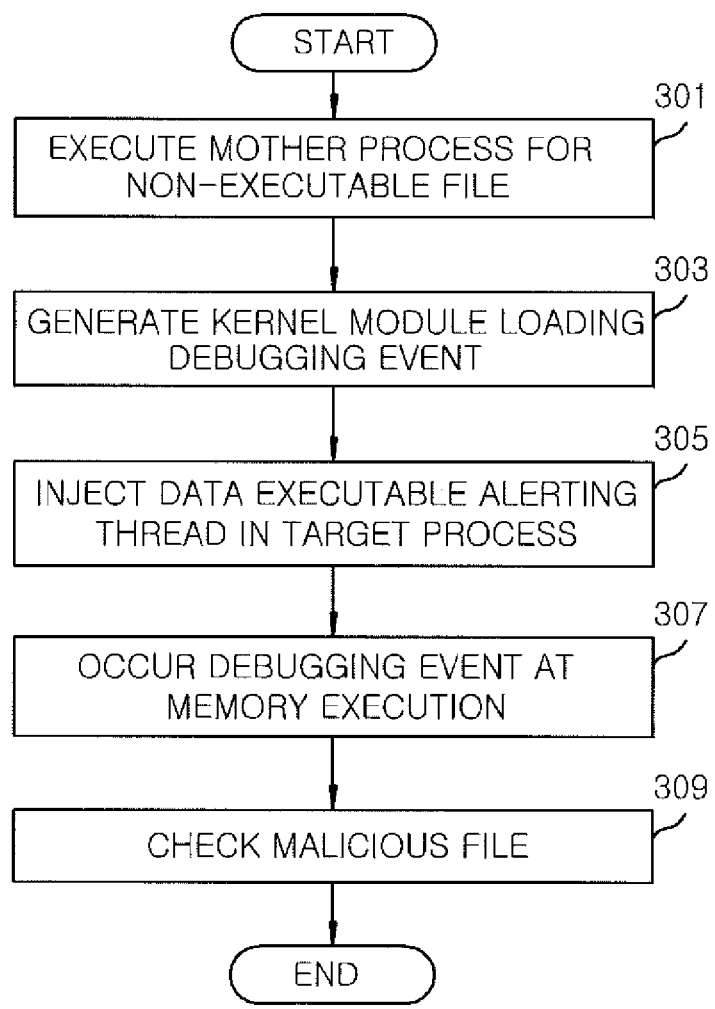
FIG. 3 is a flow chart illustrating a process of setting a non-executable memory alert in accordance with an exemplary embodiment of the present invention.
Figure 4:
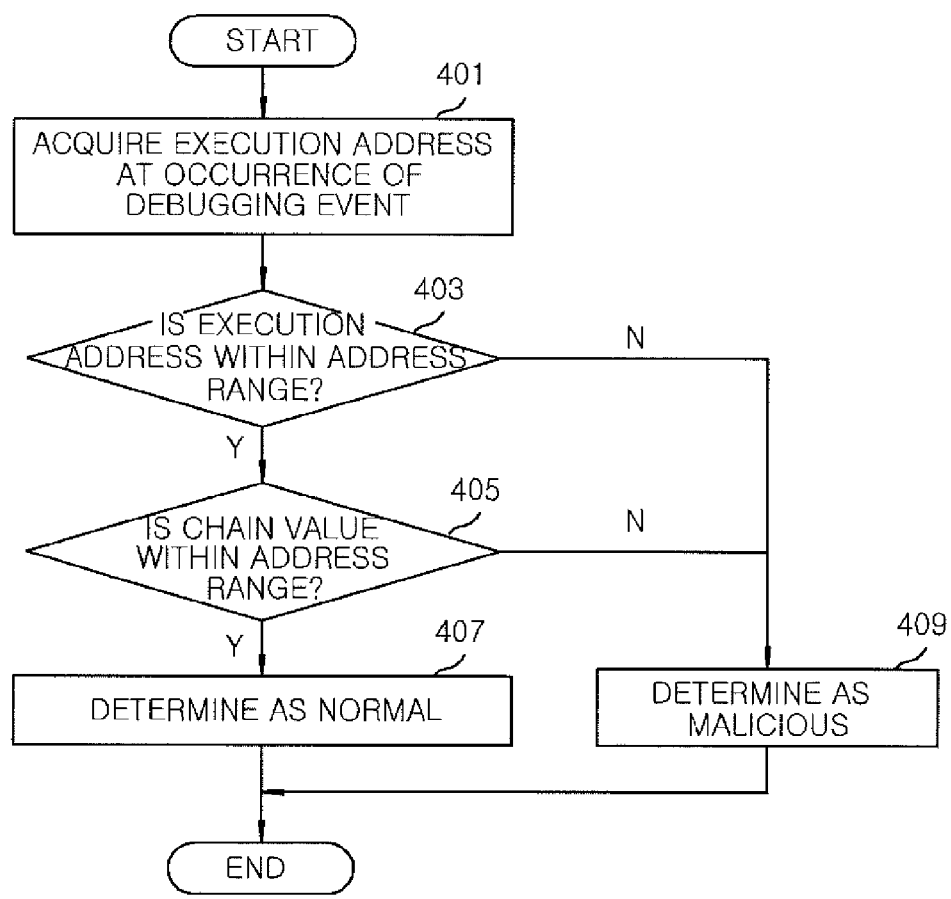
FIG. 4 is a flow chart illustrating a process of determining a malicious file in accordance with an exemplary embodiment of the present invention.
Figure 5:
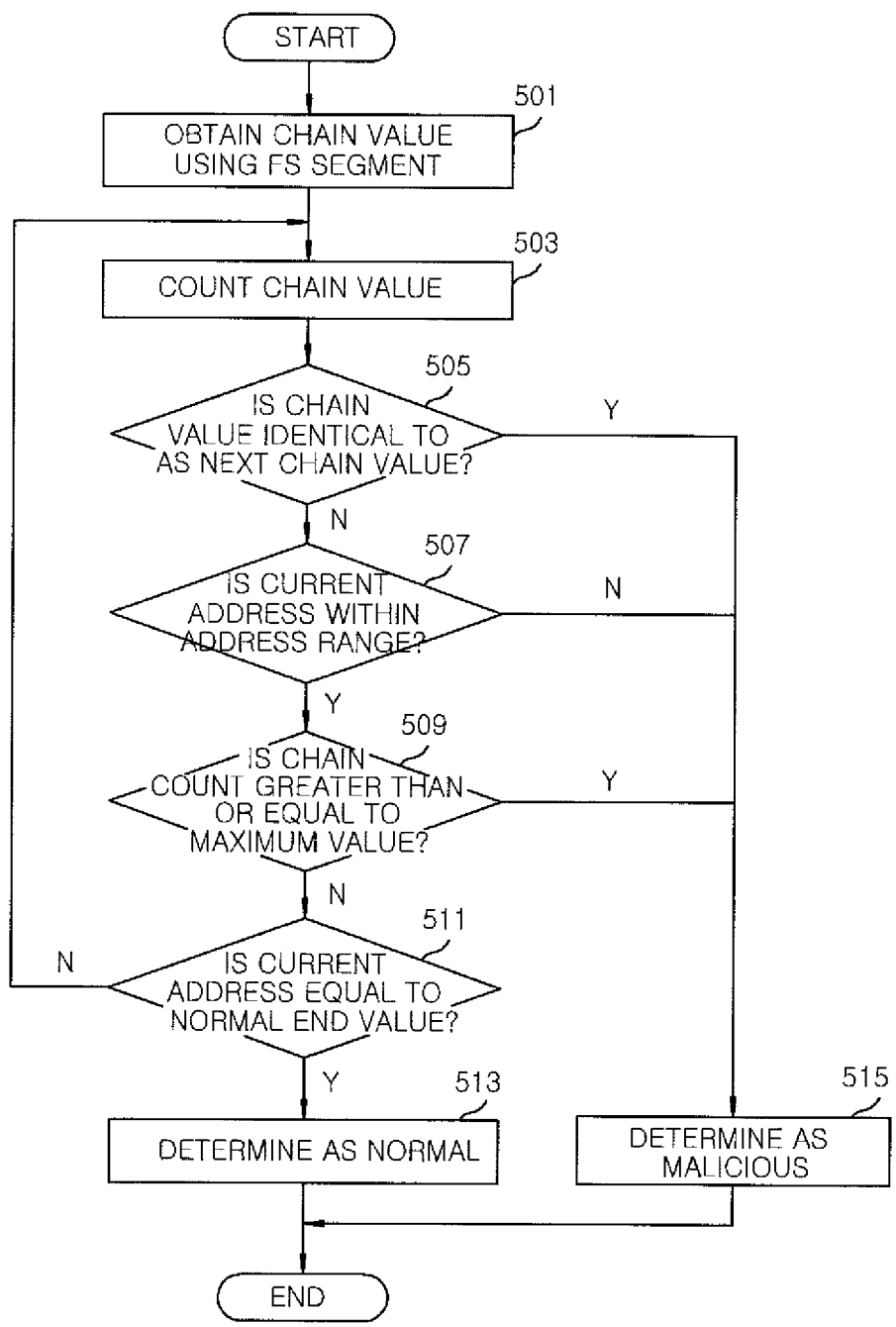
FIG. 5 is a flow chart illustrating a process performed by a structured exception handling to determine whether the non-executable file is malicious in accordance with an exemplary embodiment of the present invention.

FIG. 3 is a flow chart illustrating a process of setting a non-executable memory alert in accordance with an exemplary embodiment of the present invention; FIG. 4 is a flow chart illustrating a process of determining a malicious file in accordance with an exemplary embodiment of the present invention; and FIG. 5 is a flow chart illustrating a process of determining whether the structured exception handling is infected with a malware in accordance with an exemplary embodiment of the present invention.

These processes will be fully understood from the following detailed description of the method for detecting malicious shell codes performed by the apparatus 100 for detecting malicious shell codes as follows.

Hereinafter, the method for detecting malicious shell codes will be described with reference to FIGS. 1 to 5.

First, a user may select a directory in which a non-executable file is stored through the use of the interface 110 in operation 201, and the process execution unit 120 then checks the type of the non-executable file in the selected directory in operation 203. In other words, when the directory, which contains the non-executable file, is selected via the interface 110, the process execution unit 120 checks the type of the non-executable file based on information on the type of the non-executable file stored in the directory. For example, when a particular root folder is selected via the interface 110, the file type of the non-executable file may be checked by identifying the file type of the non-executable file stored in the particular root directory.

In operation 205, the process execution unit 120 executes a mother process adapted for processing the non-executable file. In this case, the process execution unit 120 may directly run a particular program necessary for the non-executable file to execute the mother process, or may require a separate system to do the execution of the particular program. The process execution unit 120 may provide an execution address of the instructions in the modules to be executed by the mother process. The execution address refer to as an address on a memory 180 having the modules loaded therein when each module is executed, which may be stored in the EIP register.

As such, in an environment where the mother process is executed, in operation 207, the alert setting unit 130 causes the debugging event to occur when the mother process tries to execute code with no execution attribute.

Referring to FIG. 3, the process of setting the non-executable memory alert is illustrated in detail. When the mother process for the non-executable file is executed by the process execution unit 120 in operation 301, a debugging event to load a kernel module (e.g., Kernel32.dll module) is generated by the mother process in operation 303. The alert setting unit 130 then injects the data execution alert thread into a target process to be detected in operation 305. In this regard, the injection made at the time of occurring the debugging loading is merely an illustrative purpose. Alternatively, the injection may be made at any time, for example, such as after the load of 'ntdll.dll'. As such, when there occurs the debugging event at the time of the execution of the non-executable file in operation 307, the malicious code determination unit 150 determines whether the non-executable file is the malicious file having a malicious shell code in operation 309. The procedure to determine the malicious file will be explained with reference to FIG. 2 again.

Referring back to FIG. 2, in a state where the non-executable alert is set as in operation 207, the information storage unit 140 acquires and stores information on the normal address range including the starting address and the end address for the loaded modules in the memory 180 with the execution of the mother process in operation 209.

In operation 211, thereafter, the malicious code determination unit 150 checks whether the debugging event occurs when the mother process tries to execute the code with no execution attribute. When it is checked that the debugging event occurs, the malicious code determination unit 150 performs an inspection for the malicious shell code using the acquired normal address range stored in the information storage unit 140 in operation 213 and determines whether the non-executable file is malicious in operation 215.

Referring to FIG. 4, the process of detecting the malicious shell code is illustrated in detail. First, the malicious code determination unit 150 obtains the execution address of the instruction issued by the mother process in operation 401 and checks whether the obtained execution address falls within the acquired address range stored in the information storage unit 140 in operation 403. If it is checked that the obtained execution address is out of the acquired address range, the process goes to operation 409 where the malicious code determination unit 150 determines that the non-executable file is malicious. However, if it is checked that the obtained execution address is within the acquired normal address range, the process advances to operation 405 where the malicious code determination unit 150 checks whether the chain value of the structured exceptional handling falls within the normal address range. If it is checked that the chain value of the structured exceptional handling is out of the normal address range, the malicious code determination unit 150 determines that the candidate non-executable file is malicious.

Meanwhile, if it is checked that the chain value of the structured exceptional handling is within the normal address range, the process proceeds to operation 407 where the malicious code determination unit 150 determines that the non-executable file is not malicious.

Referring to FIG. 5, a process of inspecting whether the structured exceptional handling is infected with a malware, which is performed by the malicious code determination unit 150, is described in detail. First, in operation 501, the malicious code determination unit 150 obtains the chain value of the structured exceptional handling. For example, the chain value of a debugger may be derived from the additional data segment (e.g., FS (data register F) segment) in the central processing unit.

The chain value of the structured exceptional handling is counted in operation 503, and it is checked whether the current address of the chain is the same as an address of the next chain value of the structured exceptional handling in operation 505. If it is checked that the current address of the chain value is the same as the next chain value of the structured exceptional handling, it is determined that the current address is infected and thus the non-executable file is a malicious one in operation 515.

However, if, in operation 505, it is checked that the current address of the chain value is not the same as an address of the next chain value of the structured exceptional handling, it is checked that the current address of the chain value exists in the normal address range in operation 507. If it is checked that the current address of the chain value does not exist whithin the address range in which the modules are loaded in the memory 180, it is determined that the non-executable file is malicious as in operation 515.

However, if, in operation 507, it is checked that the current address of the chain value exists in the normal address range, the malicious determination unit 150 checks whether the count of the chain value is greater than or equal to the predetermined maximum value in operation 509. If it is checked that the count of the chain value is greater than the predetermined maximum value, it is determined that the non-executable file is malicious as in operation 515. The maximum for the count of the chain value may be set arbitrarily in consideration of the time taken to determine whether the non-executable file is malicious.

Meanwhile, if, in operation 509, it is checked that the count of the chain value does not exceed the predetermined maximum value, the malicious code determination unit 150 checks whether the current address of the chain value is equal to a normal end address (e.g., 0FFFFFFFFF). If it is checked that the current address of the chain value does not equal to the normal end address, the process returns to operation 503 to repeat the procedure as described above. However, if the current address of the chain value is equal to the normal end address, the malicious code determination unit 150 determines that the non-executable file is normal.

Referring back to FIG. 2, when it is determined that the non-executable file is malicious, in operation 217, the cause analysis unit 160 compares the module having the instruction related to the execution address out of the address range with the information on the vulnerabilities to analyze the generation reason for the vulnerability, for example, the generation reason for the non-executable file exploit. In addition, the analyzed generation reason for the vulnerability may be recorded in the information storage unit 140. In this regard, the information on the vulnerabilities may be information provided from CVE (Common Vulnerabilities and Exposures), Microsoft Security Bulletin (for example, MS11-002), NVD (National Vulnerability Database), US-CERT Bulletin, and the like, but not limited thereto.

Meanwhile, when the non-executable file is determined as a malicious file by the malicious code determination unit 150, in operation 219, the malicious code extraction unit 170 extracts the malicious code in the memory region corresponding to the execution address beyond the normal address range. For example, the malicious code, which may have been decoded and stored in a virtual memory by the mother program, may be extracted in a type of an execution file or executable file. For example, the malicious code extraction unit 170 may extract the decoded malicious code in any one type of the file formats such as exe, cpl, ocx, dll, vxd, sys, scr, sdrv, and the like, but not limited thereto. Further, the extracted malicious execution file of the malicious code is used to analyze the behavior of the malicious code.

Finally, the cause analysis unit 160 may forwards an analysis log for the vulnerability generation reason to a malware inspecting and analyzing server connected to a communication network, or a particular analyzer or user; and the malicious code extraction unit 170 may transfer the code extracted in the type of the executable file or execution file to the malicious code inspecting and analyzing server connected to the communication network for the inspection request of the extracted code. Further, the malicious code determination unit 150 terminates the execution of the non-executable file, which is determined as the malicious file in operation 223. The execution termination of the non-executable file may be performed at any time after the determination of the malicious file in operation 215.

The combinations of the each block of the block diagram and each step of the flow chart may be performed by computer program instructions. Because the computer program instructions may be loaded on a general purpose computer, a special purpose computer, or other processor of programmable data processing equipment, the instructions performed through the computer or other processor of programmable data processing equipment may generate the means performing functions described in the each block of the block diagram and each step of the flow chart. Because the computer program instructions may be stored in the computer available memory or computer readable memory which is capable of intending to a computer or other programmable data processing equipment in order to embody a function in a specific way, the instructions stored in the computer available memory or computer readable may produce a manufactured item involving the instruction means performing functions described in the each block of the block diagram and each step of the flow chart. Because the computer program instructions may be loaded on the computer or other programmable data processing equipment, the instructions performing the computer or programmable data processing equipment may provide the steps to execute the functions described in the each block of the block diagram and each step of the flow chart by a series of operational steps being performed on the computer or programmable data processing equipment, thereby a process executed by a computer being generated.

Moreover, the respective blocks or the respective sequences may indicate modules, segments, or some of codes including at least one executable instruction for executing a specific logical function(s). In several alternative embodiments, it is noticed that the functions described in the blocks or the sequences may run out of order. For example, two successive blocks and sequences may be substantially executed simultaneously or often in reverse order according to corresponding functions.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for detecting malicious shell codes using a debugging event, the apparatus comprising:
    an alert setting unit configured to set a mother program for executing a non-executable file to trigger the debugging event when a mother process created by the mother program tries to execute a code with no execution attribute;
    an information storage unit configured to store information on an address range in which modules to be used by the mother process are loaded in a memory;
    a malicious code determination unit configured to determine whether the non-executable file is malicious using the information on the address range when the debugging event occurs;
    a cause analyzing unit configured to compare the module having the instruction related to the execution address out of the address range with information on vulnerabilities to analyze the reason for the vulnerability when it is determined that the non-executable file is malicious; and
    a malicious code extraction unit configured to extract the code in memory regions corresponding to the execution address out of the address range,
    wherein the alert setting unit injects a data execution alerting thread into a target process to be detected when the debugging event occurs by the mother process, and
    wherein the malicious code determination unit determines that the non-executable file is malicious when the execution address of the instruction executed by the mother process is out of the address range, determines whether the non-executable file is malicious depending on information about whether a SEH (Structured Exception Handling) is infected when the execution address of the instruction is within the address range, and determines that the structured exception handling is infected and the non-executable file is malicious when a current address of a chain value of the structured exception handling is the same as an address of a next structured exception handling.

2. The apparatus of claim 1, wherein the information storage unit stores a starting address and an end address on which the modules to be used by the mother process are loaded in the memory.

3. The apparatus of claim 1, wherein the malicious code determination unit determines that the non-executable file is malicious when the execution address of the instruction executed by the mother process is out of the address range.

4. The apparatus of claim 3, wherein the malicious code determination unit determines whether the non-executable file is malicious depending on information about whether a SEH (Structured Exception Handling) is infected when the execution address of the instruction is within the address range.

5. The apparatus of claim 1, wherein the malicious code determination unit obtains the chain value of a debugger using an additional data segment in a central processing unit.

6. The apparatus of claim 5, wherein the additional data segment is an FS register (data register F) segment.

7. The apparatus of claim 1, wherein the malicious code determination unit determines that the non-executable file is malicious when the current address of the chain value of is not the same as an address of the chain value of the next structured exception handling and the current address of the chain value does not exist whithin the address range in which the modules are loaded in the memory.

8. The apparatus of claim 7, wherein the malicious code determination unit determines that the non-executable file is malicious when the current address of the chain value exists whithin the address range in which the modules are loaded in the memory and a count of the chain value is greater than or equal to a predetermined value.

9. A method for detecting malicious shell codes using a debugging event, the method comprising:
setting a mother program for executing a non-executable file to trigger the debugging event when a mother process created by the mother program tries to execute a code with no execution attribute;
acquiring information on address range on which modules to be used by the mother process are loaded in a memory;
determining whether the non-executable file is malicious using the address range when there occurs the debugging event;
when it is determined that the non-executable file is malicious, analyzing the reason for the vulnerability by comparing the module having the instruction related to the execution address out of the address range with the information on vulnerabilities; and
when it is determined that the non-executable file is malicious, extracting the code in memory region which corresponds to the execution address beyond the address range,
wherein said setting a mother program comprises:
identifying whether there occurs the debugging event by the mother process; and
injecting a data execution alerting thread in a target process to be detected when the debugging event occurs, and
wherein said determining whether the non-executable file comprises:
determining that the non-executable file is malicious when an execution address of the instruction executed by the mother process is out of the address range;
determining whether the non-executable file is malicious depending on information about whether a SEH (Structured Exception Handling) is infected when the execution address of the instruction executed by the mother process is within the address range; and
after obtaining a chain value of the SEH, determining that the structured exception handling is infected and the non-executable file is malicious when a current address of a chain value of the structured exception handling is identical to an address of a next structured exception handling.

10. The method of claim 9, wherein said acquiring information on the address range comprises storing a starting address and an end address on which the modules to be used by the mother process are loaded in the memory.

11. The method of claim 9, wherein said determining whether the non-executable file is malicious comprises determining that the non-executable file is malicious when an execution address of the instruction executed by the mother process is out of the address range.

12. The method of claim 11, wherein said determining whether the non-executable file is malicious comprises determining whether the non-executable file is malicious depending on information about whether a SEH (Structured Exception Handling) is infected when the execution address of the instruction executed by the mother process is within the address range.

13. The method of claim 9, wherein said obtaining the chain value comprises obtaining the chain value of a debugger using an additional data segment in a central processing unit.

14. The method of claim 13, wherein the additional data segment is an FS register (data register F) segment.

15. The method of claim 9, wherein said determining whether the non-executable file is malicious comprises determining that the non-executable file is malicious when the current address of the chain value of is not the same as an address of the chain value of the next structured exception handling and the current address of the chain value does not exist whithin the address range in which the modules are loaded in the memory.

16. The method of claim 15, wherein said determining whether the non-executable file is malicious comprises determining that the non-executable file is malicious when the current address of the chain value exists whithin the address range in which the modules are loaded in the memory and a count of the chain value is greater than or equal to a predetermined value.

* * * * *